H. G. HERSEY.
FERTILIZER MIXER.
APPLICATION FILED AUG. 2, 1912.
1,046,295.
Patented Dec. 3, 1912.
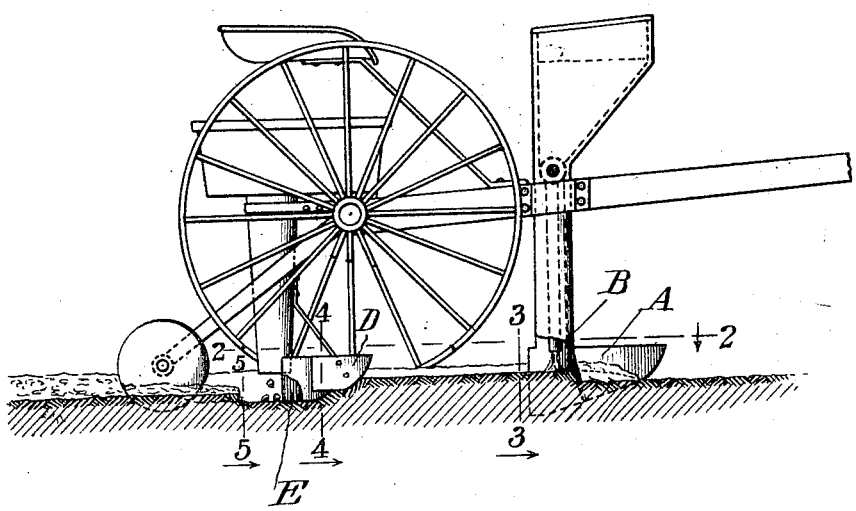
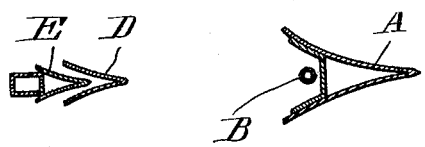
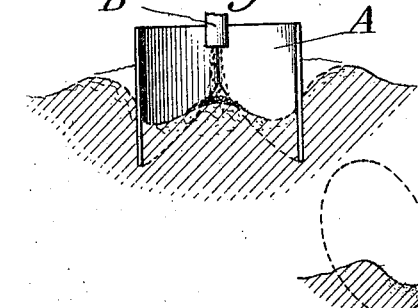
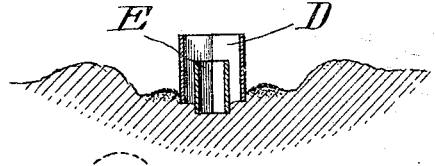
WITNESSES
INVENTOR
H. G. Hersey
Attorney

UNITED STATES PATENT OFFICE.

HARRY G. HERSEY, OF GREENVILLE, MAINE.

FERTILIZER-MIXER.

1,046,895.

Specification of Letters Patent.   Patented Dec. 5, 1912.

Application filed August 2, 1912.  Serial No. 713,072.

*To all whom it may concern:*

Be it known that I, HARRY G. HERSEY, a citizen of the United States, residing at Greenville, in the county of Piscataquis and State of Maine, have invented certain new and useful Improvements in Fertilizer-Mixers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in fertilizer mixers for use in connection with corn and other planters, and it comprises a simple and effective apparatus of this nature having various details of construction and combinations of parts, which will be hereinafter described, shown in the accompanying drawings and then specifically defined in the appended claim.

The invention is illustrated in the accompanying drawings, in which—

Figure 1, is a side elevation, showing the application of the invention to a planter.
Fig. 2 is a section on the line 2, 2 of Fig. 1.
Fig. 3 is a section on the line 3, 3 of Fig. 1.
Fig. 4 is a section on the line 4, 4, of Fig. 1.
Fig. 5 is a section on the line 5, 5 of Fig. 1.

Reference being had to the details of the drawings by letter A designates a plow or furrow opener adapted to be mounted in any suitable manner, preferably as shown in Fig. 1 of the drawings, and is adapted to open up the drill. Said plow is open at its bottom and is preferably inclined as shown, in order to allow a ridge of loose dirt to be formed as the plow passes over the ground. A spout, designated by B, is so positioned as to allow the fertilizer to drop upon the ridge of loose dirt thus formed.

It will be noted that a drill will thus be formed with the outer sides deeper than the center and with the fertilizer deposited upon the ridge, thus leaving loose dirt to mix with the fertilizer.

A second plow, designated by the letter D, is mounted in any suitable manner upon the planter and is positioned preferably behind the fertilizer spout and has its lower end nearly as low as the outside of the deepest part of the drill made by the plow A and is adapted as it passes along through the center of the ridge upon which the fertilizer has been deposited to push it to each side, thoroughly mixing it with the soil and leaving it upon each side of the drill in which the seed is adapted to be planted.

A third plow, designated by letter E, is mounted upon the planter and positioned slightly lower than the lower edge of the plow D and adapted to throw up a furrow of fresh dirt upon each side of the drill between the fertilizer and the seed, at the same time affording a place for the latter that is a little deeper in the ground than the surface upon which the fertilizer has been deposited. This is essential in order that the seed may not be burned by coming in direct contact with the fertilizer, as the fertilizer is apt to absorb all of the available moisture unless the seed is nearer the source of moisture than the fertilizer. Any cover disks or plows may be mounted upon the planter for the purpose of covering the soil over the seed after it has been deposited.

What I claim to be new is:—

A fertilizer mixer for corn planters, etc., comprising, in combination with the frame of a planter, winged plows fastened in tandem order upon the frame, the forwardmost of the plows extending below the other plows and adapted to form a drill with a central ridge, a fertilizer delivering spout having its exit end intermediate the wings of the plow, the rearmost of the plows arranged one slightly in advance of the other with their lower edges in different planes, said plow with its lower edge in the higher plane designed to furrow the ridge and mix the fertilizer with the soil leaving the latter upon either side of the drill in which the seed is adapted to be deposited, the plow terminating in the lower plane being adapted to throw a furrow of fresh dirt upon either side of the drill to form a place for the seed in a lower plane than the surface upon which the fertilizer is deposited, and covering disks behind the plows, as set forth.

In testimony whereof I hereunto affix my signature in the presence of two witnesses.

HARRY G. HERSEY.

Witnesses:
F. W. ALLEN,
LELIA M. BLANCHARD.